May 28, 1929.  A. SANDE  1,714,520
ATTACHABLE NUT
Filed Nov. 11, 1925
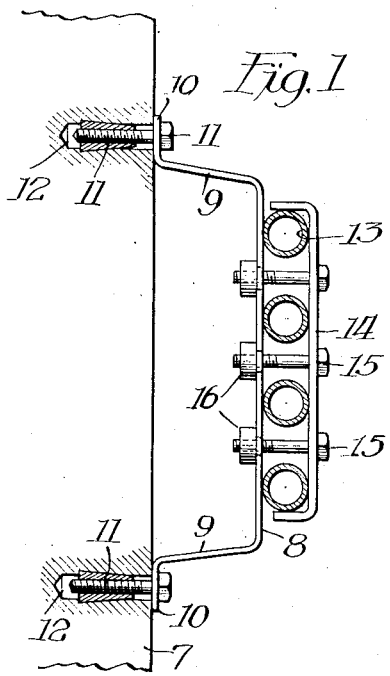
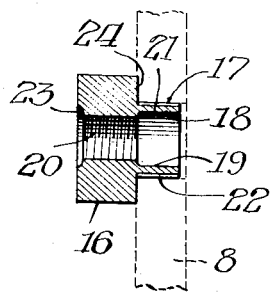
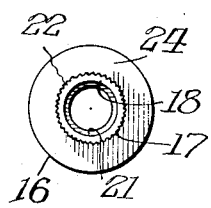
Inventor:
Andrew Sande,
by Fisher, Towle, Clapp & Soans, Attys.

Patented May 28, 1929.

1,714,520

UNITED STATES PATENT OFFICE.

ANDREW SANDE, OF CHICAGO, ILLINOIS.

ATTACHABLE NUT.

Application filed November 11, 1925. Serial No. 68,474.

This invention has special reference to the bolting together of parts of structures especially of metal, and more particularly to an attachable nut or means for mounting a nut on a bar, plate, or frame member of a bracket structure or machine, although it is to be understood that the invention is applicable to other structural devices or arrangements without restriction to its use so long as it is employed for a bolt anchoring for connecting or clamping two or more parts together so that they may be drawn tightly without fear of the bolt becoming loosened at its threaded end. The invention is therefore capable of application to safes, metallic box structures, connections between the parts of machinery and the like, with impunity.

By way of illustration, the invention is shown in use for the mounting of electric wiring conduits and the like on walls or other structures and more particularly to a bracket structure and attachable nut for use in connection therewith to anchor retaining bolts for the conduits so that the latter may be properly supported and the structure quickly and readily assembled "on the job", thus obviating the necessity of threading openings in the metal strip of the supporting structure or bracket at the expenditure of considerable time, labor, and cost for mounting the bolts.

Other and further objects of the invention will be better understood by reference to the following specification when considered in connection with the accompanying drawing illustrating a selected embodiment thereof, in which:—

Fig. 1 is a sectional elevation of a conduit supporting structure including a bracket and nuts equipped in accordance with the invention.

Fig. 2 is a sectional view showing the mounting of one form of nut.

Fig. 3 is an end elevation of the nut shown in Fig. 2 looking toward the left.

Referring to the drawings in detail, 7 designates a supporting structure or wall such as concrete, to which a heavy strip of metal in the form of a strap or bar 8 is anchored by means of its inturned ends 9 and apertured extremities 10 extending outwardly in opposite directions and in alignment. These ends are preferably parallel to the bar 8 which may be extended vertically or otherwise. Expansion bolts 11 are engaged through the apertures in the ends 10 and into sockets 12 in the wall structure or upright supporting member 7 for the purpose of anchoring the bracket formed by the strip 8.

The strip 8 is thus arranged to form a support for a series of conduits or pipes 13 for electric wiring or otherwise, in conjunction with a co-acting clamping bar 14. A series of bolts 15 pass through openings in the bar 14 and have threaded engagement or connection with the bar or strip 8 through the medium of nuts 16 so as to effectively mount and support the pipes in position by clamping action or to permit the same to rest upon the bolts or inwardly directed ends of the bar 14.

A special feature of the present invention consists in the mounting of the nuts 16 on the bar or strip 8 of the bracket or supporting structure. For this purpose the bar is apertured at spaced points with the apertures disposed in alignment with the apertures of the bar 14, these being drilled previously or at the time that the structure is set up and according to the number of conduits or pipes to be supported and other factors.

In the form shown in Figs. 2 and 3 of the drawings, the nuts 16 are fitted in the apertures 17 of the bar 8 through the medium of a reduced and relatively thin extension or annular mounting flange or wall 18, the bore 19 of which is enlarged with respect to the threaded bore 20 of the nut, thus providing an internal shoulder 21. The annular wall 18 forms a reduced extension which may be frictionally or otherwise secured in the aperture 17 of the bar 8, into which it may be forced by pressure or by striking the same with a suitable tool. In the present instance, the wall 18 is provided with a knurled exterior surface 22 produced by a series of longitudinal or axial splines or V-shaped projections which bite into the material of the wall of the aperture 17 and thus not only effectively retain the nut in position but prevent it from turning. The nut is, of course, preferably harder than the bar but this may be reversed if desired. However, since the nut is simply forced into its seat or aperture, the nut may be made round instead of with the usual wrench surface, although the nut may be equipped with the wrench surface if desired and preferably has its face countersunken as indicated at 23.

Furthermore, the extension 18 may extend entirely through the bar 8 or only partially through the same and the bore thereof being enlarged it will readily take the bolt 15 and the nut by reason of the shoulder 24 around the extension or wall 18 will engage the face of the bar 8. This will permit the bar 14 to be effectively drawn toward the bar 8 for the purpose of securing the bar 14 firmly in position and clamping the conduits or securely mounting them on the bracket structure.

From the foregoing, it will be obvious that I have provided a very efficient form of bracket structure for supporting conduits and the like as used in connection with electric wiring or otherwise, and a series of conduits or pipes may be mounted on a wall expeditiously and inexpensively. This structure obviates the necessity of tapping the supporting structure or internally threading the same by means of a hand drill which is both slow and expensive. Whether or not the extension of the nut is knurled or ribbed exteriorly in order to secure a positive connection between the same and the bar of the bracket structure, the connection is very strong and rigid. In case friction merely is depended upon, the nut will be driven into position, although the knurled or ribbed surface tends to bite into the metal of the bar and assist in preventing the nut from turning when the bolt is tightened. However, this is also facilitated by the shoulders which take up the end thrust on the nut around the reduced wall or extension thereof engaging the face of the bar, as is thought will be appreciated. Obviously, the idea may be employed in connection with safety metal boxes, junction or outlet boxes, or other similar structures where it is desired to anchor a bolt or other securing member.

It will be seen that the invention provides a novel mounting or bracket structure which may be readily arranged to support any number of conduits or pipes for electrical wiring or otherwise and in which nuts for mounting the bolts to clamp or support the pipes in position are firmly mounted on the metallic strip or bar forming part of the bracket structure so as to keep the nuts from turning and also to take all possible end thrust that may be exerted thereon in tightening the bolts into clamping position without displacing the nuts. However, it is to be understood that the invention is equally applicable to machinery or other structures for connecting, joining, or mounting parts, especially where the nuts are inaccessible.

While I have shown and described my invention in a preferred form, I am aware that various modifications and changes may be made without departing from the spirit of the invention, and I reserve the right to make all such as fairly fall within the terms of the following claim.

I claim as my invention:

An attachable nut comprising an internally threaded body, a diametrically reduced cylindrical extension co-axial with the threaded bore in the body, ribs on said extension for positive engagement with the wall of an opening provided in a base when the extension is driven therein to hold the nut on the base and to resist turning thereof in either direction, the rear face of the body projecting beyond the outer surface of the extension to abut against the surface of the base, and said extension adapted to receive therethrough the bolt for engagement with the threads of the body.

ANDREW SANDE.